United States Patent [19]
Dunn

[11] Patent Number: 5,970,695
[45] Date of Patent: Oct. 26, 1999

[54] SELF CONTAINED TRANSPORT FOR CROP HARVESTING HEADER

[75] Inventor: Jim T. Dunn, Winnipeg, Canada

[73] Assignee: Mac Don Industries Ltd., Manitoba, Canada

[21] Appl. No.: 09/138,003

[22] Filed: Aug. 21, 1998

[51] Int. Cl.$^6$ ................................................ A01B 73/00
[52] U.S. Cl. ............................ 56/228; 56/14.9; 56/16.2; 56/DIG. 14; 172/311; 172/677
[58] Field of Search ...................... 56/14.9, 15.6, 56/15.9, 228, 473.5, DIG. 14, 16.1, 16.2; 172/677, 683, 684, 776, 311, 310, 315

[56] References Cited

U.S. PATENT DOCUMENTS

| | | |
|---|---|---|
| 3,279,158 | 10/1966 | Kirkpatrick et al. . |
| 3,457,709 | 7/1969 | Killbery et al. . |
| 3,638,407 | 2/1972 | Togami ..................................... 56/15.6 |
| 3,982,643 | 9/1976 | MacGregor et al. ..................... 56/15.6 |
| 4,026,365 | 5/1977 | Anderson et al. ......................... 56/228 |
| 4,329,833 | 5/1982 | Witzel ...................................... 56/15.6 |
| 4,346,909 | 8/1982 | Hundeby . |
| 4,384,445 | 5/1983 | McIlwain ................................. 56/228 |
| 4,385,483 | 5/1983 | McIlwain ................................. 56/228 |
| 4,442,662 | 4/1984 | Jennings ................................... 56/228 |
| 4,460,193 | 7/1984 | Dietz et al. . |
| 4,573,309 | 3/1986 | Patterson . |
| 4,768,334 | 9/1988 | Honey et al. ............................. 56/15.6 |
| 4,986,064 | 1/1991 | Ermacora ................................. 56/228 |
| 4,991,383 | 2/1991 | Ermarcora ................................ 56/14.9 |
| 5,079,907 | 1/1992 | Sameshima et al. ..................... 56/15.9 |
| 5,146,737 | 9/1992 | Gantzer ................................... 56/14.9 |
| 5,243,810 | 9/1993 | Fox et al. . |
| 5,528,886 | 6/1996 | Esau ......................................... 56/14.9 |

FOREIGN PATENT DOCUMENTS

| | | |
|---|---|---|
| 973367 | 8/1975 | Canada . |
| 363 068 | 4/1990 | European Pat. Off. .......... 56/DIG. 14 |
| 529160 | 6/1955 | Italy ........................................ 56/15.6 |

OTHER PUBLICATIONS

Honey Bee Brochure (1 page). No date.
*AGCO Brochure. No date.
Co–op Implements Brochure (2 pages). No date.
Versatile Brochure (7 pages). No date.

*Primary Examiner*—Thomas B. Will
*Assistant Examiner*—Arpad Fabian Kovacs
*Attorney, Agent, or Firm*—A. Battison; M.E. Thrift

[57] ABSTRACT

A header for crop harvesting machine includes a transport arrangement towing the header in a direction at right angles to its normal working direction. The transport system includes a first wheel at one end of the header which can be steered by a hitch pole connected to the first wheel. A second wheel is located symmetrically relative to the first wheel at the opposite end of the header and is free to caster. In the normal working position of the header the first and second wheels act as gauge wheels and are left in the direction of working movement. A third wheel which is removed in the working position is attached to the cutter bar by a clamping action over the knife guard and behind the knife support plate at a respective one of the forwardly extending support arms of the header frame. The hitch includes two portions which can relatively pivoted so as to reduce the effective length of the hitch thus allowing the tractor to back up to a position closer to the header than the effective length of the hitch and allowing the hitch to be pivoted for connection.

16 Claims, 8 Drawing Sheets

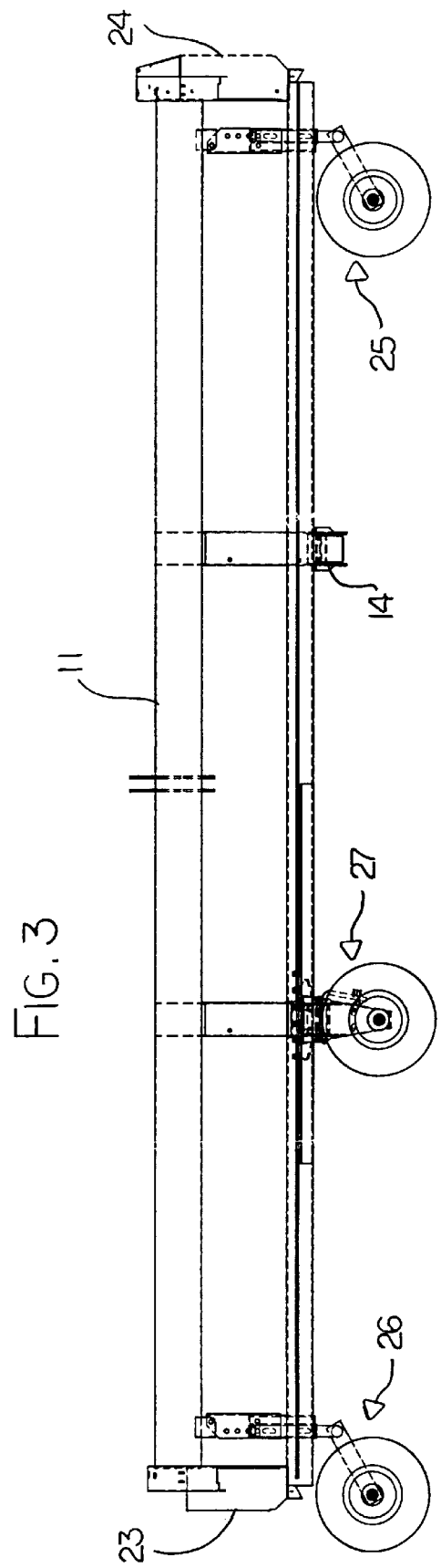

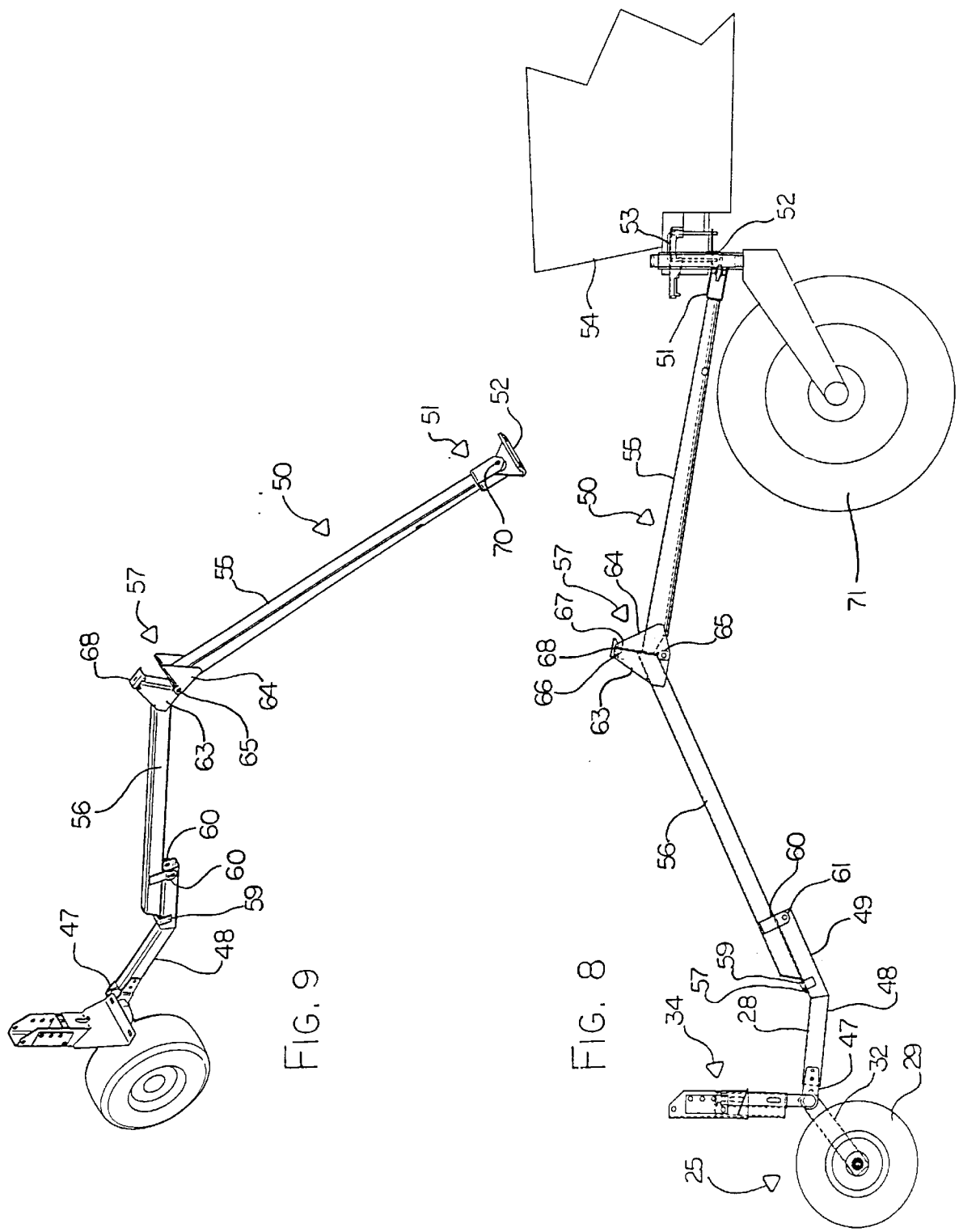

SELF CONTAINED TRANSPORT FOR CROP HARVESTING HEADER

This invention relates to a crop harvesting header including ground wheels by which the header can be trailed a transport position.

BACKGROUND OF THE INVENTION

Crop harvesting headers generally include a main frame having a main rear structural member extending across a width of the header and a plurality of arms extending forwardly from the main rear structural member to a front edge of the header. In a cutter type header, at the front edge is mounted a cutter bar carrying a cutting knife so as to cut the standing crop at the forward edge and to allow that standing crop to fall or be directed onto a platform or other support rearward of the cutting knife. In a pick-up type header, there is no cutter bar but instead a crop lifting device.

The header generally includes a transport device in the form of an auger or a draper which then carries the cut crop across the header, that is at right angles to the forward direction to a collection area.

Such headers can be used with a combine harvester for supplying the material from a collection area into the feeder housing of the combine harvester or can be used with a swather for depositing the material from the collection area onto the ground in the form a swath.

Such headers can include additional elements such as conditioning rolls which act upon the crop material before or after its movement to the collection area. Such headers may or may not include a reel which can assist in handling the crop as it is cut and moved to the platform or other support area.

The present invention is concerned with the transportation of the header and is not intended to be limited to any particular type of header.

The present invention is particularly concerned with headers of the type which are attached onto a transport vehicle, which is a combine harvester or swather tractor. The vehicle supports the header from behind the main structural member so that the header is presented forwardly of the vehicle with its width transverse to the working direction of movement of the vehicle. The width of the header is necessarily relatively large to provide a wide cutting action and this width is normally larger then can be accommodated through gates or along roads.

One important problem of a header of this type is therefore to provide a transportation arrangement for the header by which it can be separated from the transport vehicle and towed in a direction generally at right angles to the working direction so that its width when towed is significantly reduced relative to the working width.

In U.S. Pat. No. 5,243,810, issued Sep. 14, 1993, of Fox et al assigned to the present assignees, there is disclosed an arrangement by which the header includes its own transportation wheels which can be rotated from a working position to a transport position so that the header can be separated from the transport vehicle and towed generally by the same transport vehicle in a direction at right angles to its working direction.

With this arrangement there is a single wheel at one end of the header and a tandem wheel arrangement at the opposite end of the header. The single wheel is rotated through 90° and carries a hitch pole which is attached to the towing vehicle. The towing vehicle therefore steers the single wheel at one end of the header. The tandem wheel arrangement initially provides an axle which is at right angles to the direction of working movement and provides two wheels spaced across the width of the header. When moved to the transport position, the axle is turned through 90° so that one wheel moves forwardly of the header to a position in front of the cutter bar so the axle can provide support for the cutter bar. The header is therefore supported in the transport position on the single front wheel and on the transverse rear axle and is towed by steering the front wheel with the hitch pole while the rear axle remains fixed. The single wheel and the tandem wheel arrangement in the working position of the header act as gauge wheels rolling upon the ground and holding the header at a required height relative to the ground.

This arrangement has achieved considerable success and is widely used on larger headers greater than 30 feet in width.

However in regard to smaller headers of the order of 30 feet or less, the axle arrangement can not be accommodated and therefore this arrangement is impractical for headers of this size.

An alternative arrangement for transporting a header of this type is to provide a separate trailer onto which the header is placed for towing behind the transport vehicle. However the trailer is inconvenient, relatively expensive and has the problem that it is generally in the wrong place when transport of the header is required.

Honey Bee of Saskatchewan, Canada, show in their brochure a header for attachment to a bidirectional tractor where the tractor is attached at a position adjacent one end of the header and additional ground wheel is provided on the header adjacent the opposed end. The header is moved to a transport position by rotating the header relative to the attachment of the tractor and by actuating the ground wheel to move to a support position underneath the header. The header can therefore be transported in a direction inclined at an angle of the order of 60° to its normal working direction thus reducing its width. In the transport position, therefore, the header is supported on the hitch of the tractor and upon the additional separate ground wheel. This arrangement is limited to an off-centre mounting on the header and to a bidirectional tractor and therefore is unsuitable for more conventional arrangements.

AGCO in their brochure for their 600 header transport arrangement provide a ground wheel at one end of the header which is steered by the towing vehicle and an additional wheel at the opposed end of the header which moves from a folded position underneath the header outwardly to a position in front of the cutter bar. This arrangement does not support the header in a manner which is sufficiently stable.

Examples of pull-type swathers are shown in U.S. Pat. Nos. 4,573,309 (Patterson), issued Sep. 15, 1987; 3,279,158 (Kirkpatrick), issued Oct. 18, 1966; 4,346,909 (Hundeby), issued Aug. 31, 1982; 3,457,709 (Killbery), issued Jul. 29, 1969; 4,460,193 (Dietz), issued Jul. 17, 1984. Further examples are shown in Canadian Patent 973,367 (International Harvester), issued Aug. 26, 1975, and in brochures issued by Co-op Implements and Versatile. In many of these arrangements an additional wheel is added to the header frame at a suitable location so that the header frame is supported on three ground wheels at spaced positions to form a stable structure. In the Versatile arrangement, the outside wheel can be a dual wheel system which rotates about a vertical axis directly between the wheels. The header frame is supported by a jack and a further wheel is added at the hitch end forward of the header frame to provide a stable trailer construction.

None of these arrangements provide an effective transportation system for a header through a self-propelled vehicle and none provide a suitable system for attachment of an additional ground wheel or for attachment of the necessary hitch.

SUMMARY OF THE INVENTION

It is one object of the present invention, therefore, to provide an improved header of the type which can be separated from a support vehicle and which includes its own wheels so that it can be attached to a towing vehicle, which may be the same vehicle, and towed in a direction at right angles to the normal working direction.

According to a first aspect of the invention there is provided a header for a crop harvesting machine comprising:

a header frame having an elongate support structure arranged across a width of the header;

a mounting assembly attached to the header frame for releasably mounting the header frame on a vehicle for movement across the ground carrying a crop to be harvested such that, when mounted on the vehicle, the header frame is supported on the vehicle for movement with the vehicle in a working direction transverse to the width of the header frame;

the header frame having a plurality of support arms mounted on the support structure and extending therefrom forwardly of the working direction a feed member mounted on the header frame for carrying the cut crop along the header frame for collection at a discharge area of the header frame;

and a transport wheel arrangement on the header frame for transporting the header when removed from the vehicle in a transport direction generally longitudinal of the header frame and at a right angle to the working direction, the transport wheel arrangement comprising:

a first wheel mounted on the header frame at a first end of the header frame on the support structure at a rear end of the support arms;

a second wheel mounted on the header frame at a second end of the header frame on the support structure at a rear end of the support arms;

a third wheel mounted on the header frame at a forward end of the support arms at the cutter bar and at a position intermediate the ends of the header frame so as to be located intermediate the first and second wheels;

such that the header can stably rest upon the first, second and third wheels;

the first and second wheels each having a respective mounting member carried on the header frame for rotational movement about a respective substantially vertical axis allowing a direction of rolling movement of the respective wheel to be rotated about the respective axis;

the third wheel having the direction of rolling movement thereof fixed in the transport direction;

and a hitch arm for connection to the header so as apply a pulling force to the header from a tractor.

Preferably the hitch arm is connected to the mounting member of the first wheel so as apply a pulling force to the header from a tractor through the mounting member of the first wheel and so as to effect a steering movement of the first wheel about the respective vertical axis and wherein the second wheel is free to caster about the respective vertical axis.

Preferably the mounting members of the first and second wheels are rotatable to a working position, in which the direction of rolling movement of the respective wheel lies along the working direction, and are lockable in the working position to act as gauge wheels.

Preferably the mounting member of each of the first and second wheels includes a vertical post and a vertical sleeve within which the post is slidable allowing adjustment of the height of the first and second wheels when in the working position.

Preferably there is provided a locking pin for locking the post of a respective one of the first and second wheels at a required height in the sleeve, the pin being movable to a release position in which the respective wheel is free to rotate about the vertical axis of the sleeve.

Preferably the hitch arm has a front end for connection to the tractor and a rear end for connection to the mounting member of the first wheel; wherein there is provided a pivot connection at a position along the length of the hitch arm arranged to define a rigid front portion of the hitch arm and a rigid rear portion of the hitch arm arranged for relative pivotal movement of the front and rear portions at the pivotal connection from an extended position of the hitch arm in which the pivotal connection is locked such that the hitch arm is rigid and defines a hitch arm length to a folded shortened position of the hitch arm; wherein the hitch arm is disconnectable and reconnectable at a disconnection position along its length for disconnection of the header from the tractor; and wherein the hitch arm is reconnectable while in the folded shortened position such that, with the hitch arm disconnected at the disconnection position, the tractor is moved to a position closer to the mounting member than the hitch arm length, the hitch arm is pivoted to the folded shortened position, the hitch arm is reconnected at the disconnection position and the tractor moved to pivot the hitch to the extended position.

Preferably the disconnection position is arranged at a position forwardly of the mounting member so as to leave a portion of the hitch arm connected to the mounting member to define a lever for manual rotation of the mounting member about the vertical axis of the first wheel.

Preferably the disconnection position is arranged at the pivot connection.

Preferably the disconnection position is arranged forwardly of the pivot connection.

Preferably the front and rear portions of the hitch arm are arranged for pivotal movement at the pivot connection about a substantially horizontal axis such that the front and rear portions pivot in a substantially vertical plane.

Preferably the front and rear portions of the hitch arm are arranged such that the pivot connection moves upwardly in the substantially vertical plane.

Preferably front and rear portions of the hitch arm are arranged at an angle in the extended position less than 180 degrees such that the hitch arm forms an apex at the pivot connection.

Preferably the third wheel is arranged at a forward end of a support arm closest to a centre of the header frame.

Preferably the third wheel includes a third wheel mounting member which is removable from the header frame.

Preferably the third wheel mounting member is clamped to the header frame at a forward end of a support arm.

Preferably the third wheel mounting member includes a portion thereof engaging over at least one knife guard of the cutter bar.

Preferably the third wheel mounting member includes a forward portion engaging the cutter bar and a rearward portion engaging a transverse element of the support arm and includes a manually operable clamp element for effecting a clamping action between the forward portion and the rearward portion.

According to a second aspect of the invention there is provided a header for a crop harvesting machine comprising:

a header frame having an elongate support structure arranged across a width of the header;

a mounting assembly attached to the header frame for releasably mounting the header frame on a vehicle for movement across the ground carrying a crop to be harvested such that, when mounted on the vehicle, the header frame is supported on the vehicle for movement with the vehicle in a working direction transverse to the width of the header frame;

the header frame having a plurality of support arms mounted on the support structure and extending therefrom forwardly of the working direction a feed member mounted on the header frame for carrying the cut crop along the header frame for collection at a discharge area of the header frame;

and a transport wheel arrangement on the header frame for transporting the header when removed from the vehicle in a transport direction generally longitudinal of the header frame and at a right angle to the working direction, the transport wheel arrangement comprising:

a first front wheel mounted on the header frame at a first end of the header frame on the support structure;

at least one second rear wheel mounted on the header frame on the support structure such that the header can stably rest upon the first wheel and the at least one second wheel;

the first wheel having a mounting member carried on the header frame for rotational movement about a respective substantially vertical axis allowing a direction of rolling movement of the first wheel to be rotated about the axis;

and a hitch arm having a front end for connection to the tractor and a rear end for connection to the header so as apply a pulling force to The header from a tractor;

the hitch arm having a pivot connection at a position along the length of the hitch arm arranged to define a rigid front portion of the hitch arm and a rigid rear portion of the hitch arm and arranged for relative pivotal movement of the front and rear portions at the pivotal connection from an extended position of the hitch arm, in which the pivotal connection is locked such that the hitch arm is rigid and defines a hitch arm length, to a folded shortened position of the hitch arm;

the hitch arm being disconnectable and reconnectable at a disconnection position along its length for disconnection of the header from the tractor and being reconnectable while in the folded shortened position;

such that, with the hitch arm disconnected at the disconnection position, the tractor is moved to a position closer to the header than the hitch arm length, the hitch arm is pivoted to the folded shortened position, the hitch arm is reconnected at the disconnection position and the tractor moved to pivot the hitch to the extended position.

According to a third aspect of the invention there is provided a header for a crop harvesting machine comprising:

a header frame having an elongate support structure arranged across a width of the header;

a mounting assembly attached to the header frame for releasably mounting the header frame on a vehicle for movement across the ground carrying a crop to be harvested such that, when mounted on the vehicle, the header frame is supported on the vehicle for movement with the vehicle in a working direction transverse to the width of the header frame;

the header frame having a plurality of support arms mounted on the support structure and extending therefrom forwardly of the working direction a feed member mounted on the header frame for carrying the cut crop along the header frame for collection at a discharge area of the header frame;

and a transport wheel arrangement on the header frame for transporting the header when removed from the vehicle in a transport direction generally longitudinal of the header frame and at a right angle to the working direction, the transport wheel arrangement comprising:

a first front wheel mounted on the header frame at a first end of the header frame on the support structure;

at least one second rear wheel mounted on the header frame on the support structure such that the header can stably rest upon the first wheel and the at least one second wheel;

the first wheel having a mounting member carried on the header frame for rotational movement about a respective substantially vertical axis allowing a direction of rolling movement of the first wheel to be rotated about the axis;

the at least one second wheel including a removable wheel having a mounting member clamped to the header frame at a forward end of a support arm for removal therefrom.

BRIEF DESCRIPTION OF THE DRAWINGS

One embodiment of the invention will now be described in conjunction with the accompanying drawings in which:

FIG. 3 is a front elevational view of the header of FIG. 1 again with the remaining elements removed for convenience of illustration.

FIG. 8 is an elevational view from the same direction as FIG. 3 showing the connection of the hitch to the tractor.

FIG. 9 is an isometric view of the hitch of FIG. 3 when removed from the header and from the tractor and showing the hitch in the folded position for connection to the header.

In the drawings like characters of reference indicate corresponding parts in the different figures.

DETAILED DESCRIPTION

Figure 1:
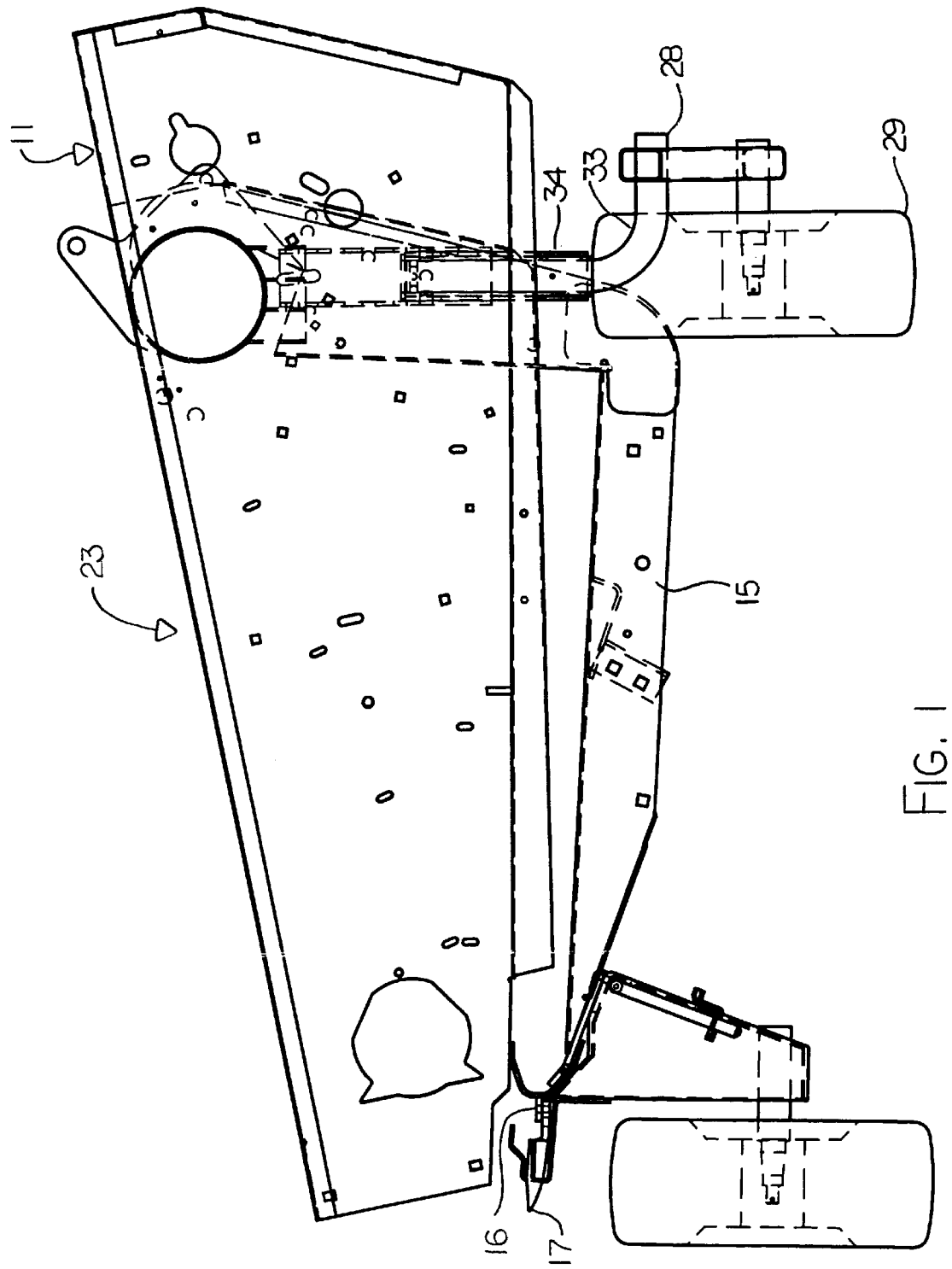
FIG. 1 is a end elevational view of a header according to the present invention.
Figure 2:
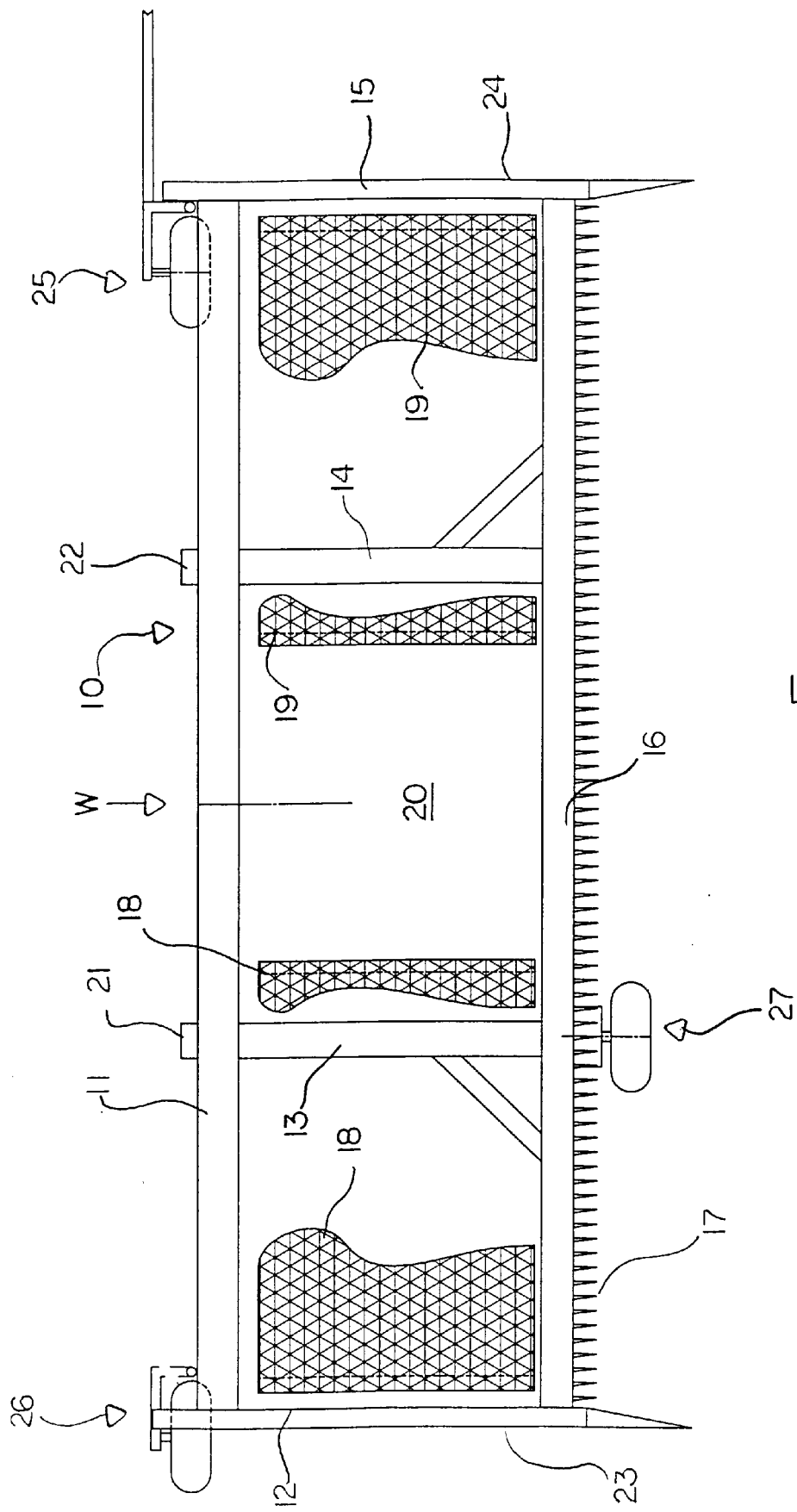
FIG. 2 is a top plan view showing the header frame and transport arrangement with the remaining elements removed for convenience of illustration.

As shown generally in FIGS. 1, 2 and 3, a header generally indicated at 10 includes a main frame having a rear structural member 11 and four forwardly projecting support arms 12, 13, 14 and 15. At the forward end of the support arms is a transverse cutter bar 16 which carries a cutting knife 17 thus defining a front edge of the header for cutting a standing crop.

In this example the header frame carries a pair of draper elements 18 and 19 which are shown only schematically and only in part as an exemplary illustration. These draper elements act to transport the cut crop across the width of the header to a discharge area 20 from which the cut crop can be discharged onto the ground, fed into a crop conditioner or fed into a feeder housing of a combine harvester depending upon the particular requirements of the header.

The header frame further includes a pair of mounting members schematically indicated at 21 and 22 for attachment to a transport vehicle located behind the header and moving forwardly in a direction W of working movement of the header to transport the header in front of the vehicle. The header frame further includes end support plates 23 and 24.

The details of the frame, the cutter bar, the transport element and other parts (not shown) are not described in detail herein as these will be well-known to one skilled in the art and can vary widely depending upon the requirements of a particular header.

The present invention is concerned with the transportation of the header frame and for this purpose the header frame is provided three support wheels including a first wheel 25, a second wheel 26 and a third wheel 27.

Figure 4:
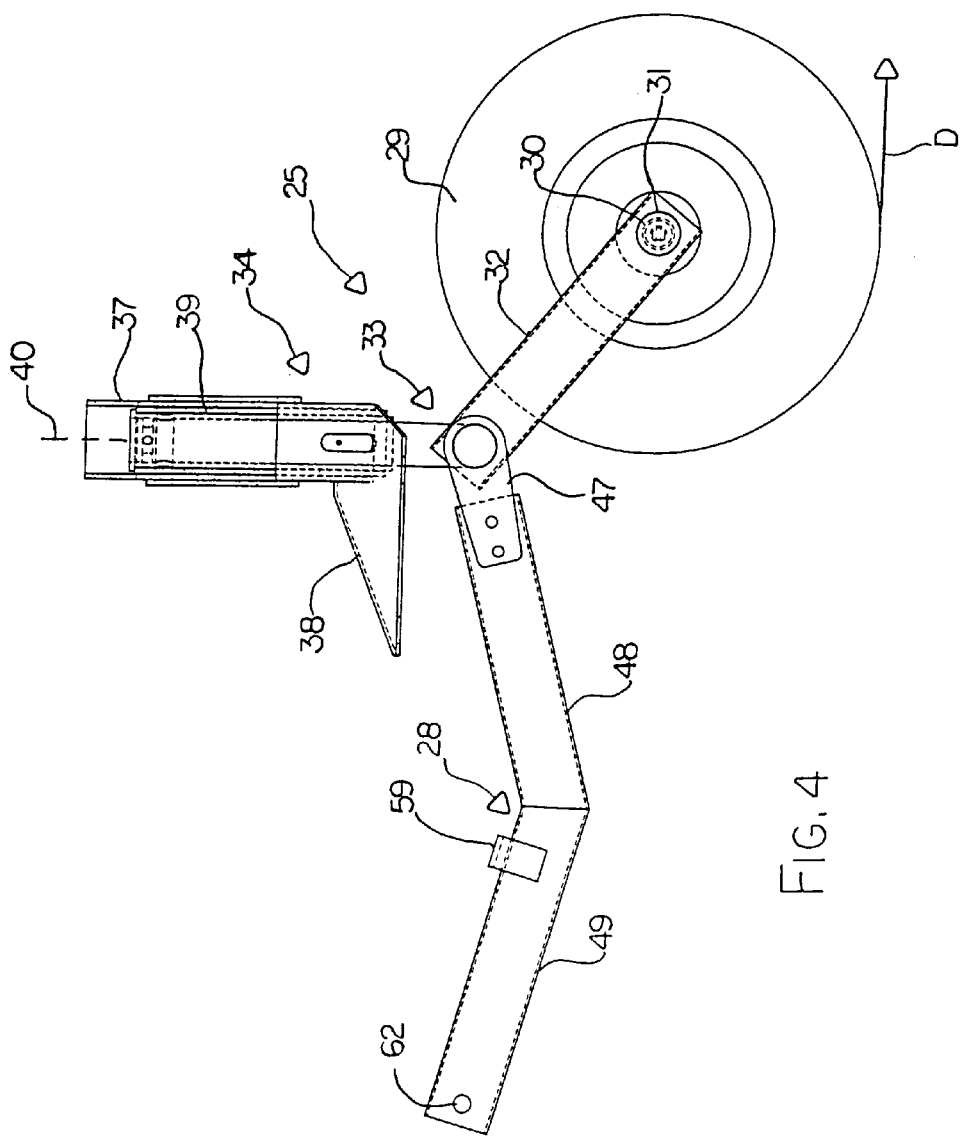
FIG. 4 is a front elevational view similar to that of FIG. 3 showing only the first steered wheel.

The first and second wheels 25, 26 are in effect symmetrical in that each is arranged at a respective end of the header frame. One of the wheels is therefore shown in FIGS. 4 and 5 and the other wheel is substantially identical except that only the wheel 25 includes a hitch arm 28 described hereinafter.

The wheels 25 and 26 therefore include a ground wheel 29 mounted on a spindle 30 allowing the wheel to rotate about a horizontal axis 31 so as to define a direction of rolling movement D at right angles to the horizontal axis 31. The spindle 30 is fixed to an inclined trailing link 32 which is inclined upwardly and forwardly from the spindle 30 to a mounting arm 33 of a mounting member generally indicated at 34. The mounting arm 33 includes a horizontal portion 35 which is bent into a vertical portion 36. The trailing link 32 extends downwardly and rearwardly from the horizontal portion 35 to the spindle 30. It will be appreciated that the wheel 25 can be rotated through 180 degrees for attachment to the hitch arm 28.

The mounting member 34 further includes an outer square support sleeve 37 which is attached to the frame at the rear structural member 11 by an attachment bracket 38. Thus the sleeve 37 is held substantially vertical in a fixed position relative to the frame. The mounting member further includes an inner slide member 39 which can slide upwardly and downwardly within the sleeve 37. The vertical portion 36 of the arm 33 is cylindrical and is mounted within the inner slide member 39 for rotation about a vertical axis 40.

Figure 5:
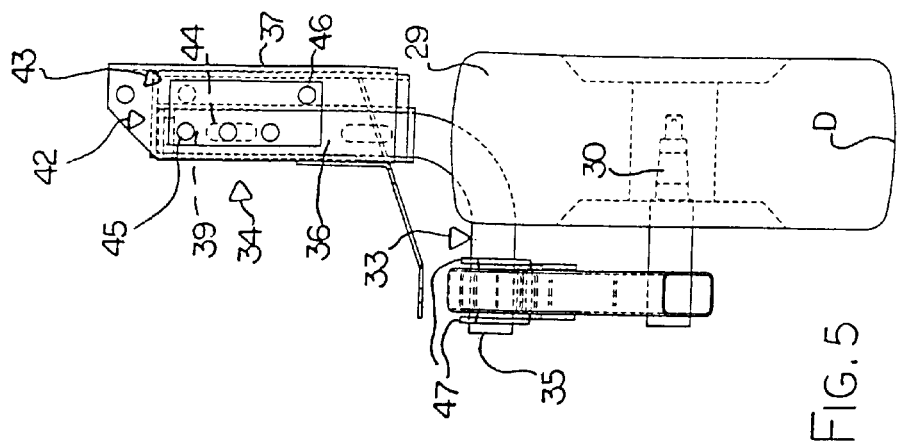
FIG. 5 is an end elevational view along of the wheel of FIG. 4.

As is best shown in FIG. 5 the vertical portion 36 is aligned with a front portion 42 of the sliding member 37 leaving a rear portion 43 of the slide member exposed beyond the vertical portion 36. The slide member 37 includes a hole 44 which can be aligned with a selected one of three holes 45 in the outer sleeve 37. The hole 44 is also aligned with a hole passing through the vertical portion 36. The insertion of a pin through the hole 44 and through a selected one of the holes 45 therefore locks the slide member 39 at a fixed height within the sleeve 37 and at the same time locks the vertical portion 36 against rotation about the vertical axis 40. When so locked, therefore, the wheel is facing forwardly so that the direction D lies along the direction W which is the working direction. The selection of a respective one of the holes 45 allows adjustment of the height of the wheel relative to the same. In this position, therefore, both the wheels 25 and 26 are fixed and can act as gauge wheels for the header moving across the field in the working direction.

When the pin is removed from the selected one of the holes 45 it can move instead to a hole 46 where the slide member 39 is fixed within the sleeve 37 but the vertical portion 36 is free to rotate about the vertical axis 40. In this position of the pin within the hole 46, the wheel 26 is free to caster in a conventional castering manner since the link 32 trails the vertical axis 40. The first wheel 25 can in addition be steered by steering movements of the hitch arm 28 which is attached to the horizontal portion 35 by a bracket 47.

Turning now to FIG. 8, it will be noted that the hitch arm 28 includes a first portion 48 and a second portion 49 attached to the end of the portion 48 and cranked relative thereto at an angle so as to extend from the outer end of the portion 48 upwardly and forwardly from the wheel. The hitch arm 28 connects to a main hitch portion generally indicated at 50 having a forward end 51 pivotally connected by a bracket 52 to a hitch 53 of a tractor 54. The main hitch member 50 includes a front portion 55 and rear portion 56 connected together by a pivot coupling 57. The rear end of the rear portion 56 is connected to the front portion 49 of the hitch arm 28 so as to form an extension thereof rigidly coupled thereto. The connection is provided by a tongue 57 projecting under a strap 59 welded on the top of the portion 49. A pair of side straps 60 extend downwardly from the sides of the portion 56 so the pin can lock the side straps in place passing through a hole 61 in each of the side straps and co-operating with an aligned hole in the front end of the portion 49.

The pivot coupling 57 includes a channel bracket 63 welded on the end of the portion 56 and the co-operating channel bracket 64 welded on the end of the portion 55. Each of the channel brackets 63 and 64 has a pair of sides welded to the respective portion 55, 56 with the sides extending above and below the respective end of the portion. The sides overlap to receive a pivot pin 65 underneath the ends of the portions. Each channel bracket includes an end plate 66, 67 so that these end plates abut when the portions are moved downwardly and relatively pivot about the pin 65. A latch 68 is mounted on the bracket 63 for pivotal movement relative thereto and has a front hook portion for engaging over the top of the bracket 64 to latch the brackets in fixed position when the portions are moved downwardly as shown in FIG. 8. The latch however can be released to allow the brackets to move upwardly thus causing the lower ends of the portions 55 and 56 to move inwardly toward one another. The pivot pin 65 is substantially horizontal so that the portions 55 and 56 move upwardly and downwardly in a vertical plane.

In operation of the hitch, the main hitch portion 50 is attached to the tractor but is in a stored position obtained by folding the portion 56 under the portion 55 and by pivoting the portion 55 about the bracket 52 about a vertical pivot pin 70 to a position lying horizontally across the rear of the tractor 54. The tractor 54 is moved rearwardly to a position closer to the mounting member 34 of the wheel 25 than the full length of the hitch arm including the portions 28, 55 and 56.

With the tractor backed up toward the mounting member 34 of the wheel 25, the hitch arm 28 is manually moved so as to twist the wheel about the vertical axis 40 to a position in which the hitch arm 28 projects toward the hitch 53 of the tractor. In this position the main hitch portion 50 is removed from its stored position and the portion 56 is folded out from underneath the portion 55. As the distance between the hitch 53 and the mounting arm 34 is less than the full length of the hitch member, it is necessary to pivot the pivot connection 57 upwardly to allow the end of the portion 56 to be engaged onto the portion 49. The upward triangular arrangement of the main hitch portion 50 thus takes up the shortened distance by reducing the length of the third side of the triangle from the end of the portion 48 to the hitch 52.

When the portion 56 is rigidly connected to the portion 49, the tractor can move forwardly so that the pivot coupling 57 is pulled downwardly as the length of the third side of the triangle increases.

The end plates 66 and 67 are arranged so that in the lowest position of the pivot coupling, the portions 55 and 56 are inclined upwardly to an apex at the horizontal pivot pin 65. This arched triangular shape allows the portion 55 to pass over the rear caster wheel 71 of the tractor 54 in a situation where the tractor 54 is of the type having driven front wheels and rear caster wheels. In a situation where the hitch is sufficiently clear of the rear of the tractor to avoid the necessity for passing over a rear wheel, the hitch may form a simple straight line in the latched towing position.

In the embodiment shown, the length of the third side of the triangle is decreased by pivoting the pivot connection 57 upwardly about a horizontal pivot pin 65. It is also possible to achieve the same effect by providing a pivot connection having a vertical pivot pin so that the pivot connection pivots in a horizontal plane.

Figure 6:
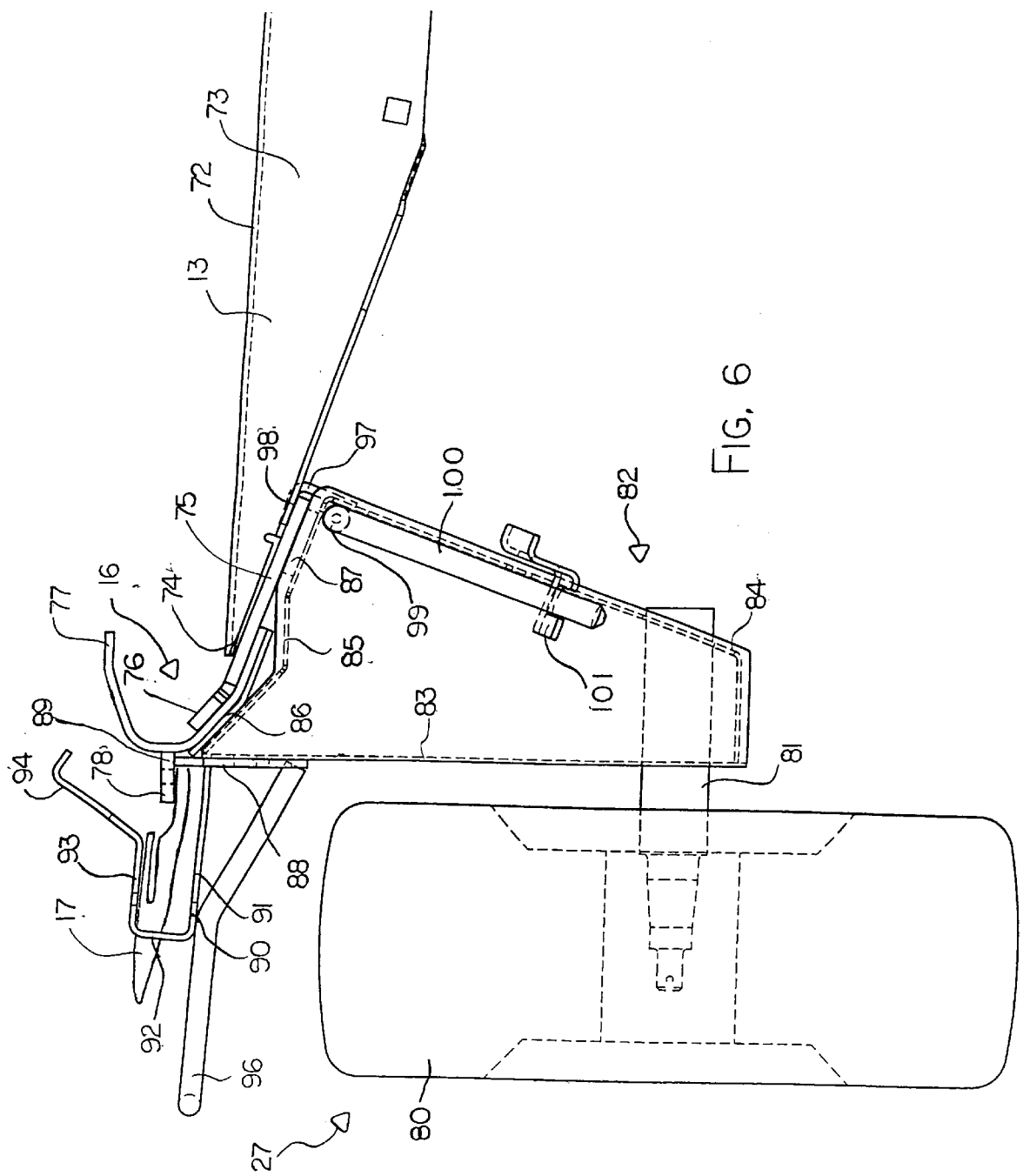
FIG. 6 is vertical cross-sectional view of the third fixed wheel of FIG. 3 fixed in place on the header.
Figure 7:
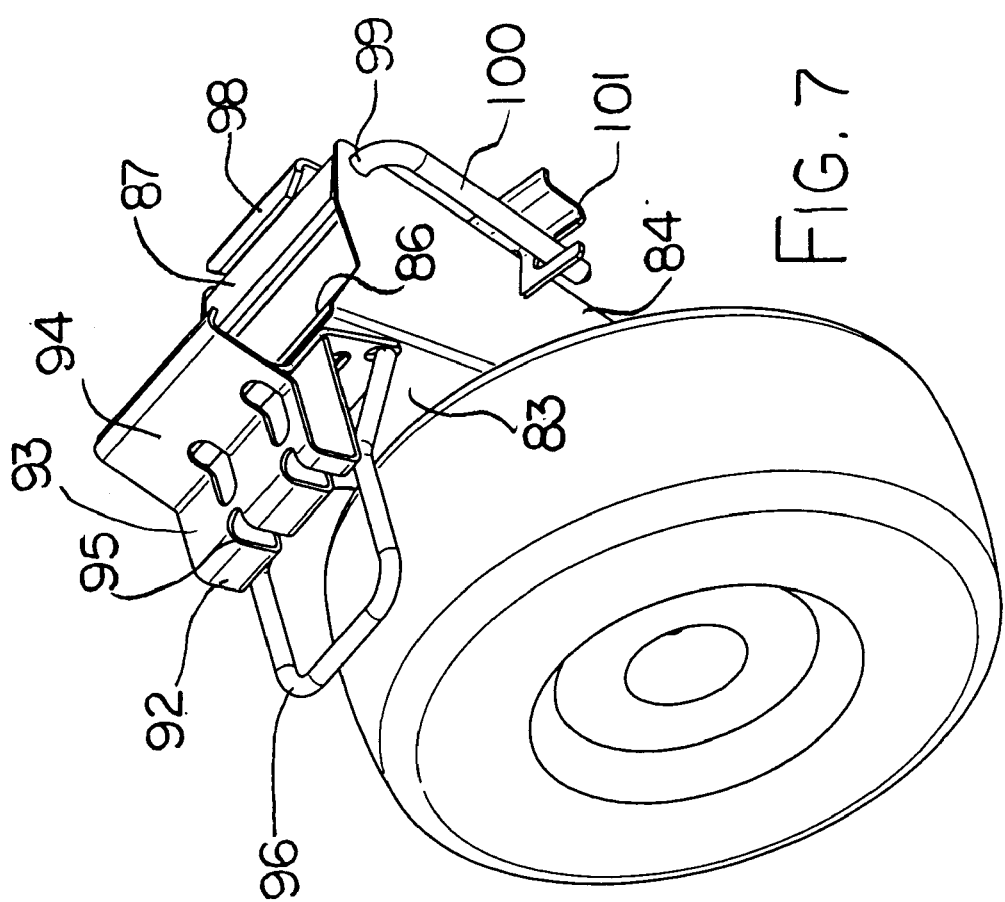
FIG. 7 is an isometric view of the third fixed wheel of FIG. 3 when removed from the header.

Turning now to the third wheel 27, the mounting of this on the forward end of the support arm 13 at the cutter bar 16 is shown in more detail in FIGS. 6 and 7. The support arm 13 comprises a channel member defined by a top web 72 and depending sides 73. The channel member is chamfered at its outer end so the bottom edge converges upwardly to an apex 74 at the web 72.

Across the full width of the header is attached the cutter bar 16 which includes a plate 75 welded to the underside of the depending side 73 of the support member. The forward end 76 of the plate 75 projects beyond the apex 74 and carries a channel member 77. A horizontal flange 78 projects forwardly from a vertical web of the channel member 77 and the flange 78 defines the main support for the cutter knife including knife guards 17. The cutter knife is not shown in detail since this will be well-known to one skilled in the art.

The wheel 27 includes a ground wheel 80 mounted on the spindle 81 fixed to the lower end of a mounting member 82. The mounting member includes a front plate 83 and two side walls 84 extending rearwardly from the front plate. Across the top of the side wall 84 is attached a top plate 85. The top plate carries a first pad 86 which is shaped to engage the underside of the channel member 77. The top plate 85 carries a second pad 87 which is arranged to engage the rear edge of the plate 75 at the support 13. The front plate 83 carries a front abutment plate 88 which extends upwardly from the front plate 83 to a top edge 89 of the plate 88 which abuts the underside of the flange 78. The top edge of the plate 88 includes cut out portions which allow the top edge 89 to reach the flange 78 in between the knife guards 17 but with the cut out portions bridging the knife guards at the areas on the flange 78 where the knife guards are located.

On the front abutment plate 88 is mounted a cover plate portion 90 having a horizontal section 91 underneath the knife guards, a vertical section 92, a second horizontal section 93 and an upwardly and rearwardly inclined section 94. The vertical section 92 has a plurality of holes 95 through which individual knife guards can be inserted. The horizontal top section 93 sits on top of the knife guards so as to be supported thereby. The inclined rear section 94 acts simply as a cover.

A loop shaped handle 96 is attached to the bottom of the front abutment plate 88 and extends forwardly therefrom in front of the vertical portion 92 to allow the wheel to be grasped and lifted by a user standing front of the cutter bar 16.

A rear latch plate 97 carries a top lug 98 which engages over the rear edge of the plate 75. The lug 98 is welded to a horizontal pivot rod 99 with a handle 100 which can be manually operated to pivot the lug 98 forwardly and rearwardly from a latching position to a release position. A bracket 101 can be used to lock the handle 100 in place.

In operation, therefore, with the wheel 27 removed, the wheel is brought into position at the support bar 14 and moved rearwardly toward the cutter bar 16. The front cover portion 91 is carefully pushed over the respective knife guards 17 at the support arm 13 and those knife guards are fed through the holes 95 in the front plate. The front abutment plate 88 is then moved upwardly into engagement with the underside of the flange 78 and the top plate 85 is moved upwardly and rearwardly until the pad 87 engages the underside of the plate 75. The lug is then pivoted from the release position to a latch position by actuation of the handle 100 thus holding the wheel mounting member clamped against the underside of the plate 75, against the underside of the flange 78 and against the top side of the knife guards 17.

The wheel is thus held in place and forces upwardly from the spindle are transmitted through the mounting member into the underside of the plate 75 where they can be effectively communicated into the support arms.

With the wheel 27 in place and the wheel 25 connected to the hitch, a towing action is effected through the hitch pulling on the mounting member of the first wheel 25. The first wheel 25 is steered by the hitch so that it follows behind the hitch. The second wheel 26 is free to caster. The third wheel 27 is fixed so that its direction of rolling movement lies directly along the cutter bar that is at right angles to working direction W.

This wheel arrangement provides an effective towing action of the header since the header tends to move directly along its length and since it tends to steer about the vertical axis through the fixed wheel 27. The fixed wheel 27 is mounted on one of the support arms closest to the centre of the header so that the vertical axis about which the header tends to pivot is defined adjacent the centre of the header. This allows the relatively long header to follow the tractor in an effective manner.

Figure 10:
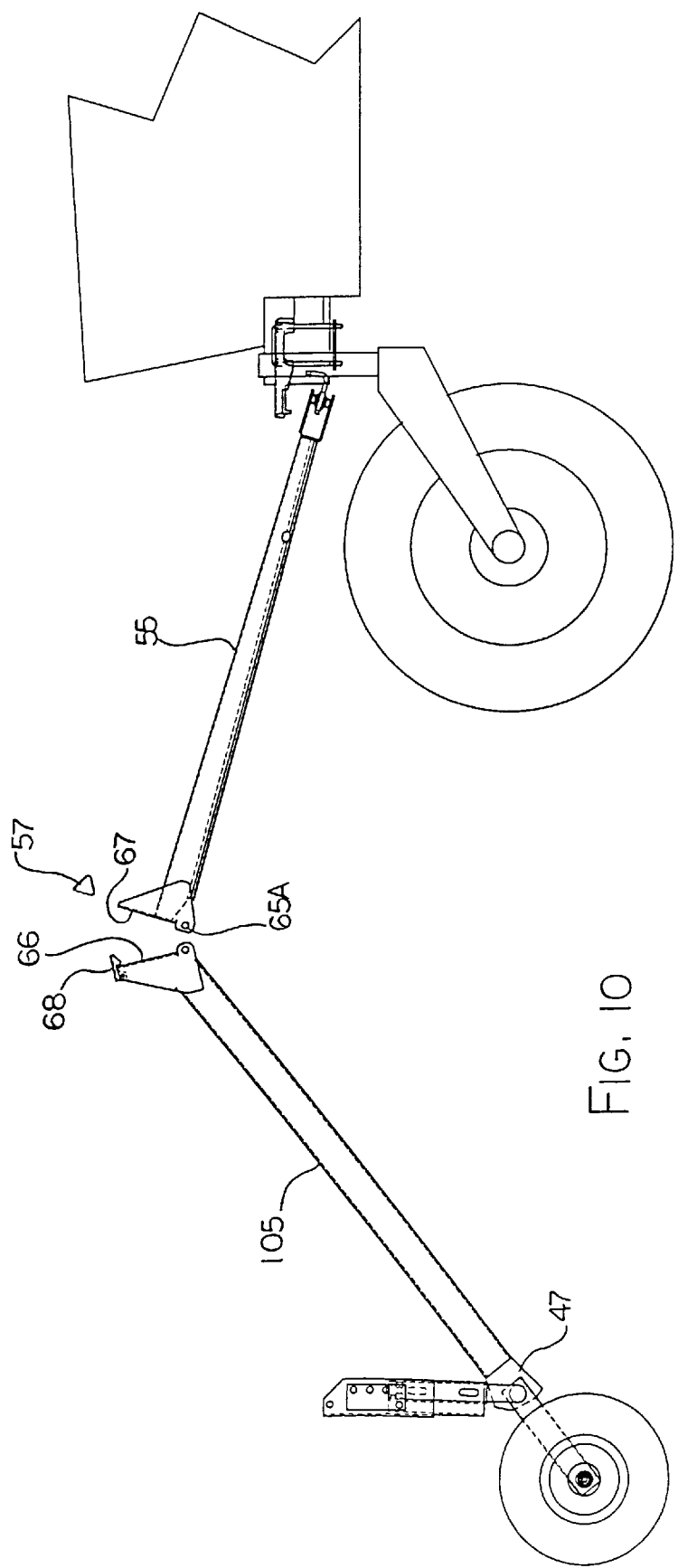
FIG. 10 is a view similar to that of FIG. 8 showing an alternative construction of the hitch.

Turning now to FIG. 10, there is shown an alternative arrangement for the hitch. In this arrangement the hitch arm portion 28 and the portion 56 of the main hitch portion are formed as a single element indicated at 105. Thus the rear end of the portion 105 includes the bracket 47 which is attached to the mounting member of the wheel. The pivot coupling 57 is substantially as previously described connecting the rear portion 105 to the front portion 55. In this arrangement, the pivot pin 65A is removable so as to allow the front portion 55 to be separated from the rear portion 105.

In operation of the hitch of FIG. 10, therefore, when the hitch is to be deployed, the rear portion 105 is detached from the front portion 55 by pulling the pin 65A. When the rear portion 105 is detached, as it is attached to the mounting member of the wheel by the bracket 47 allowing the wheel 25 to be steered so as to be directed toward the hitch coupling 53 of the tractor. In this position, with the tractor backed up to a position closer to the header than the length of the hitch, the portions 105 and 55 are inclined upwardly and are reconnected by reinserting the pin 65A while inclined upward as shown in FIG. 10. As previously described, this upward inclination reduces the length of the third side of the triangle to the distance between the hitch coupling of the tractor and of the mounting member 34 of the wheel. When the pin 65A is reinserted, the tractor can be moved forwardly allowing the portions 105 and 55 to pivot downwardly until the end plates 66 and 67 re-engage and the latch 68 actuated to hold the pivot connection in its fixed position for towing. In both the embodiments showing in FIG. 8 and FIG. 10, therefore, the hitch is rigid so that both the portions of the hitch are themselves rigid and are rigidly connected by the pivot connection. The header is thus held at the required distance from the tractor and the front wheel of the header is steered by the side to side movement of the hitch.

In an alternative arrangement not shown, the hitch arm is connected to the frame of the header and the front first wheel is allowed to caster.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A header for a crop harvesting machine comprising:
   a header frame having an elongate support structure arranged across a width of the header;
   a mounting assembly attached to the header frame for releasably mounting the header frame on a vehicle for movement across the ground carrying a crop to be harvested such that, when mounted on the vehicle, the header frame is supported on the vehicle in front of the vehicle for movement with the vehicle in a forward working direction transverse to the width of the header frame;
   the header frame having a plurality of support arms mounted on the support structure and extending therefrom forwardly of the working direction;
   a cutter bar extending across the width of the header having a cutter knife thereon for cutting a standing crop to be deposited into the header frame as the header is moved forwardly over the ground;
   a feed member mounted on the header frame for carrying the deposited crop along the header frame for collection at a discharge area of the header frame;
   and a transport wheel arrangement on the header frame for transporting the header when removed from the vehicle in a transport direction generally longitudinal of the header frame and at a right angle to the working direction, the transport wheel arrangement comprising:
   a first wheel mounted on the header frame at a first end of the header frame on the support structure at a rear end of the support arms;
   a second wheel mounted on the header frame at a second end of the header frame on the support structure at a rear end of the support arms;
   a third wheel having a mounting coupling for mounting the third wheel on the header frame at a forward end of one of the support arms at the cutter bar and at a position intermediate the first and second ends of the header frame so as to be located intermediate the first and second wheels;
   such that the header can stably rest upon the first, second and third wheels;
   the first and second wheels each having a respective mounting member carried on the header frame for rotational movement about a respective upstanding axis allowing a direction of rolling movement of the respective wheel to be rotated about the respective axis;
   the third wheel having the direction of rolling movement thereof permanently fixed so that the third wheel moves in the transport direction when attached to the header frame;
   the mounting coupling of the third wheel being independent of and separate from the first and second wheels;
   the mounting coupling of the third wheel being readily releasable from the header frame such that the third wheel is removed from the header frame when the header is moved in the forward working direction and readily attachable to the header frame such that the third wheel is attached to the header frame when the header is moved in the transport direction;
   the mounting coupling of the third wheel providing a mechanical connection to said one of the support arms at the cutter bar so as to communicate forces from the ground to the header frame through said one of the support arms during movement in the transport direction;
   and a hitch arm for connection to the header so as to apply a pulling force to the header from a tractor.

2. The header according to claim 1 wherein the hitch arm is connected to the mounting member of the first wheel so as apply a pulling force to the header from a tractor through the mounting member of the first wheel and so as to effect a steering movement of the first wheel about the respective vertical axis and wherein the second wheel is free to caster about the respective axis.

3. The header according to claim 1 wherein the mounting members of each of the first and second wheels are rotatable to a working position, in which the direction of rolling movement of the respective wheel lies along the forward working direction, and are lockable in the working position to act as gauge wheels.

4. The header according to claim 3 wherein the mounting member of each of the first and second wheels includes a vertical post and a vertical sleeve within which the post is slidable allowing adjustment of the height of the respective one of the first and second wheels when in the working position.

5. The header according to claim 4 wherein there is provided a locking pin for locking the post of a respective one of the first and second wheels at a required height in the sleeve, the pin being movable to a release position in which the respective wheel is free to rotate about a vertical axis of the sleeve.

6. The header according to claim 2 wherein the hitch arm comprises a single hitch arm having a coupling at a front end for connection at a single connection point to the tractor and a rear end for connection at a single connection point to the mounting member of tie first wheel;

wherein there is provided a pivot connection at a position along the length of the hitch arm arranged to define a rigid front portion of the hitch arm extending from the coupling at the front end to the pivot connection and a rigid rear portion of the hitch arm extending from the coupling at the rear end to the pivot connection, the pivot connection being arranged to provide relative pivotal movement of the front and rear portions at the pivotal connection about an axis transverse to a length of the hitch arm from an extended position of the hitch arm, in which extended position the coupling at the front end is at a maximum distance from the coupling at the rear end and in which extended position the pivot connection is locked such that the hitch arm is rigid and defines a maximum hitch arm length between the front end and the rear end, to a folded shortened position of the hitch arm in which shortened position the coupling at the front end is moved by the pivotal movement closer to the coupling at the rear end;

and wherein the hitch arm is disconnectable and reconnectable at a disconnection location along its length for disconnection of the header from the tractor; and wherein the hitch arm is reconnectable while in the folded shortened position such that, with the hitch arm disconnected at the disconnection position, the tractor is moved to a position closer to the mounting member than the hitch arm length, the hitch arm is pivoted to the folded shortened position, the hitch arm is reconnected at the disconnection location and the tractor moved to pivot the hitch to the extended position.

7. The header according to claim 6 wherein the disconnection location is arranged at a position forwardly of the mounting member so as to leave a portion of the hitch arm connected to the mounting member to define a lever for manual rotation of the mounting member about the vertical axis of the first wheel.

8. The header according to claim 6 wherein the disconnection location is arranged at the pivot connection.

9. The header according to claim 6 wherein the disconnection location is arranged forwardly of the pivot connection.

10. The header according to claim 6 wherein the front and rear portions of the hitch arm are arranged for pivotal movement at the pivot connection about a substantially horizontal axis such that the front and rear portions pivot in a substantially vertical plane.

11. The header according to claim 10 wherein the front and rear portions of the hitch arm are arranged such that the pivot connection moves upwardly in said substantially vertical plane.

12. The header according to claim 10 wherein front and rear portions of the hitch arm are arranged in the extended position at an angle less than 180 degrees such that the hitch arm forms an apex at the pivot connection.

13. The header according to claim 1 wherein said one of the support arms is arranged closest to a centre of the header frame.

14. The header according to claim 1 wherein said mounting coupling of the third wheel includes a forward portion engaging the cutter bar and a rearward portion engaging an element of said one of the support arms which is transverse to the length of said one of the support arms and includes a manually operable clamp element for effecting a clamping action between the forward portion and the rearward portion such that the mounting coupling is attached to and communicates forces to said one of the support arms.

15. A header for a crop harvesting machine comprising:

a header frame having an elongate support structure arranged across a width of the header;

a mounting assembly attached to the header frame for releasably mounting the header frame on a vehicle in front of the vehicle for movement across the ground carrying a crop to be harvested such that, when mounted on the vehicle, the header frame is supported on the vehicle for movement with the vehicle in a forward working direction transverse to the width of the header frame;

the header frame having a plurality of support arms mounted on the support structure and extending therefrom forwardly of the working direction;

a cutter bar extending across the width of the header having a cutter knife thereon for cutting a standing crop to be deposited into the header frame as the header is moved forwardly over the ground;

a feed member mounted on the header frame for carrying the deposited crop along the header frame for collection at a discharge area of the header frame;

and a transport wheel arrangement on the header frame for transporting the header when removed from the vehicle in a transport direction generally longitudinal of the header frame and at a right angle to the working direction, the transport wheel arrangement comprising:

at least one first wheel mounted on the header frame at the support structure;

a removable wheel mounted on the header frame at a forward end of one of the support arms, the removable wheel having a direction of rolling movement thereof fixed in the transport direction;

the removable wheel having a mounting coupling for mounting the removable wheel on the header frame at said forward end of said one of said support arms at the cutter bar the mounting coupling of the removable wheel being readily releasable from the header frame such that the removable wheel is removed from the header frame when the header is moved in the forward working direction and readily attachable to the header frame such that the removable wheel is attached to the header frame when the header is moved in the transport direction;

the mounting coupling of the removable wheel being independent of and separate from said at least one first wheel;

said mounting coupling of the removable wheel including a forward portion engaging the cutter bar and a rearward portion engaging an element of said one of the support arms which is transverse to the length of said one of the support arms and including a manually operable clamp element for effecting a clamping action between the forward portion and the rearward portion such that the mounting coupling is attached to and communicates forces to said one of the support arms;

and a hitch arm for connection to the header so as to apply a pulling force in the transport direction to the header from a tractor.

16. The header according to claim 15 wherein the cutter bar has a plurality of knife guards thereon and wherein the removable wheel mounting coupling includes a portion thereof engaging over at least one knife guard of the cutter bar.

* * * * *